UNITED STATES PATENT OFFICE.

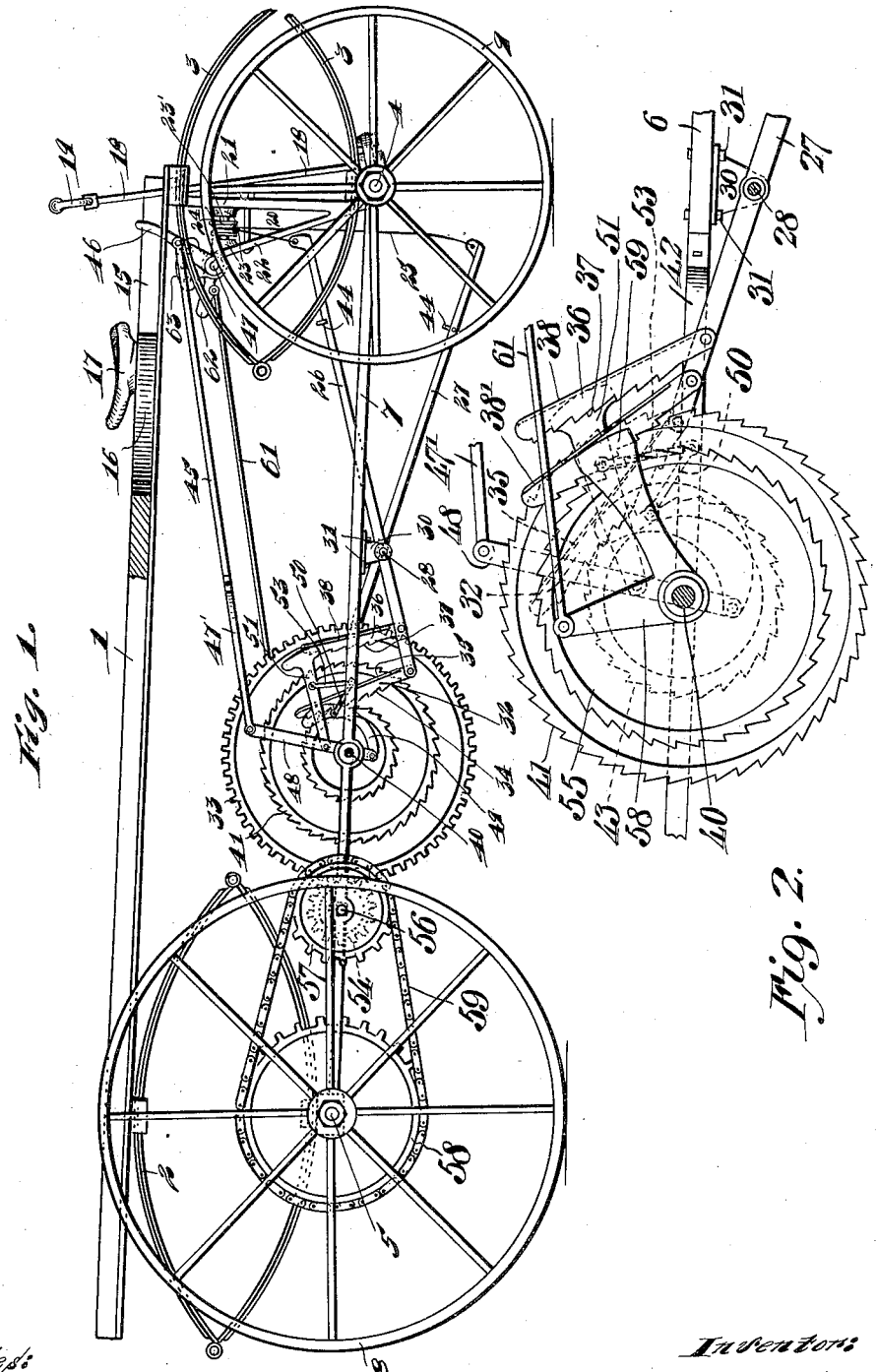

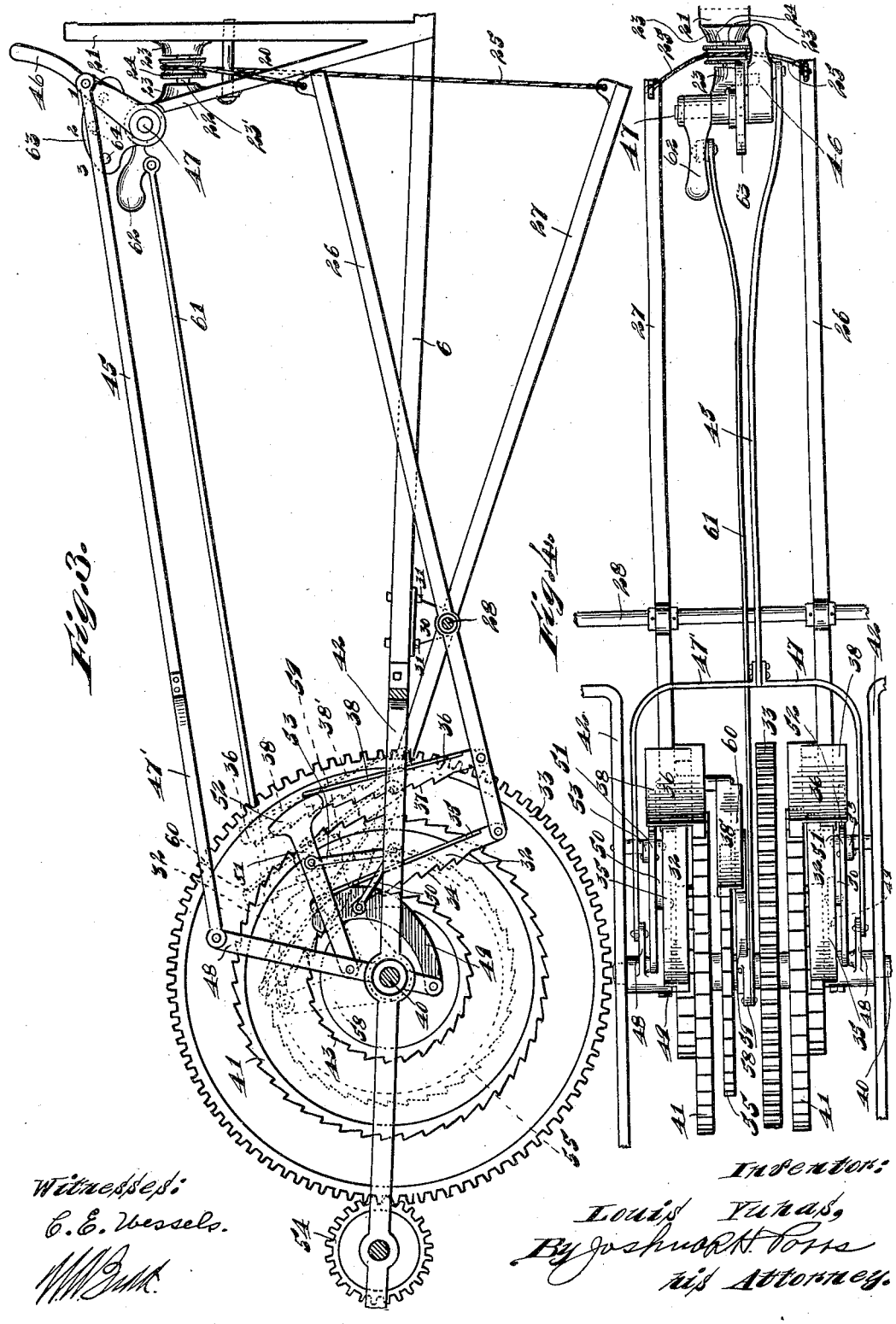

LOUIS YUHAS, OF CHICAGO, ILLINOIS.

OPERATING MEANS FOR VELOCIPEDES.

1,092,197. Specification of Letters Patent. Patented Apr. 7, 1914.

Application filed March 3, 1913. Serial No. 751,920.

*To all whom it may concern:*

Be it known that I, LOUIS YUHAS, a former subject of the King of Hungary, but having declared my intention of becoming a citizen of the United States, and a resident of the city of Chicago, county of Cook, and State of Illinois, have invented certain new and useful Improvements in Operating Means for Velocipedes, of which the following is a specification.

My invention relates to a new and improved method of propelling vehicles and it consists in applying power to the driving wheels through the medium of racks, having teeth adapted to intermesh with driving gears, when the vehicle is operated in one direction, and when the operation is reversed, the racks are actuated to disengage the teeth from the said gears.

The object of my invention is to provide a velocipede vehicle of simple construction wherein the propulsive power is directly under the control of the operator.

With this and other objects in view, my invention consists in the features, details of construction and combinations of parts which will first be described in connection with the accompanying drawings and particularly pointed out in the claims.

In the drawings, Figure 1 is a side elevation of a vehicle embodying my invention, Fig. 2 is an enlarged detail side elevation of a driving gearing, Fig. 3 is an enlarged detail elevation of the gears and racks, showing the operating pedals and governing mechanism and the adjusting levers, and Fig. 4 is a plan view of same.

Referring more particularly to the drawings, 1 represents the body or platform, which is supported in the usual manner on springs 2 and 3, secured at the opposite ends of the said body. The springs 2 and 3 are mounted on the axles 4 and 5, which extend transversely across the longitudinal frame members 6 and 7, the axle 5 being revolubly mounted in suitable bearings adjacent the rear of the said frame. The wheels 8 are secured on the rear axle 5 and revolve therewith, and a similar set of wheels 9 are revolubly mounted on axle 4. The body 1 at its forward end, is cut inwardly to provide openings 15 for the legs of the operator and a centrally projecting seat supporting portion 16 is formed thereby, the latter having a seat 17 mounted thereon. The steering rod 18 at its lower end is connected to axle 4 and on its upper end is provided with the handle 19, which extends above the body at its cut out portion, and provides means whereby the said vehicle is guided.

Centrally mounted on the front axle of the vehicle and projecting upwardly therefrom, is the V-shaped bar member 20, having diverging arms 21 and 22. Bearings 23 are arranged on the inner sides of said arms 21 and 22, adapted for the reception of the shaft 23′, which carries the pulley 24. The strap 25 is adapted for frictional engagement with said pulley and has its opposite ends secured to the forward ends of the pedal bars 26 and 27. The said pedal bars 26 and 27 extend longitudinally of the frame 1 and are pivotally mounted adjacent their rear ends, on the transverse shaft 28, the latter being mounted in bearings 30 secured by bolts 31 to the lower edges of the frame members 6 and 7. The racks 32 disposed at the opposite sides of the driving gear 33, are pivotally mounted on the inner ends of the pedal bars 26 and 27, and project upwardly at an angle away from the said pedal bars, being provided with series of teeth 34. The said racks are provided with edge flanges 35, and pivotally mounted on the said pedal bars above the racks 32, are racks 36, which are likewise normally inclined and have teeth 37 and flanges 38. Pedal bar 27 is provided with an additional rack 38′, which is pivotally mounted between racks 32 and 36, and substantially of the same construction.

Keyed on shaft 40, having bearings in the frame members 6 and 7, at the rear of the frame 1, are the ratchet wheels 41 one gear disposed at each side of the gear 33, the latter being also keyed on the said shaft at the central part thereof.

Bracket members 42 are secured to the inner sides of the frame members 6 and 7 and their opposite ends are loosely mounted on axle 5. The said brackets are apertured for the reception of shaft 40, and serve to further support the latter adjacent its central portion. Ratchet wheels 43 are keyed on the shaft 40 at the opposite sides of ratchet wheels 41 and are of less diameter than the said ratchet wheels 41, being adapted for meshing union with the racks 32. The ratchet wheels 41 are adapted for engagement with racks 36, when the pedal bars 26 and 27 are pushed downwardly at their forward ends. Pins 44 are provided on the said pedal bars, and adapted for actuation by the feet of the operator, serving to move the said pedal bars alternately up and down, causing strap 25 to frictionally engage the pulley 24, thereby governing the relative movement of the said pedal bars. The racks 32 and 36 are actuated into and out of meshing engagement with the pairs of ratchet wheels 41 and 43, by means of the adjusting rod 45, consisting of a longitudinal bar secured at one end to the hand lever 46, the latter being pivotally mounted on the pin 47, in the upper end of the arm member 22 of the bar 20. The opposite end of the adjusting rod is secured to the parallel U-shaped arms 47′, extending rearwardly and connecting with the upper ends of the levers 48. The said levers 48 are pivotally mounted adjacent their lower ends on the shaft 40. Pivotally secured at the extreme lower ends of the levers 48 are the arcuate shoe members 49, adapted when actuated by the adjusting rod 45, to engage the flanges 35 of racks 32. Links 50 are pivoted at one end to the shoe members 49 and have their opposite ends secured to the bracket members 42 and serve to limit the movement of the said shoe members. Pivotally mounted on the levers 48, above shaft 40, are the levers 51 having shoe members 52, adapted for normal engagement with the flanges 38 on the racks 36 for throwing the same into and out of meshing union with the ratchet wheels 41. A link 53 pivotally connects the lever 51 with the bracket members 42, and also serves to limit the movement of the rack 36. It is thus seen that both sets of racks cannot be simultaneously in mesh with the gears.

Keyed on the revoluble axle 5, and having meshing engagement with the driving gear 33 is a gear 54 by which motion is transmitted from the driving gear through shaft 56, sprocket wheels 57 and 58 and sprocket chain 59 to the said axle.

By use of the small and large sets of ratchet wheels 43 and 41, it is readily perceived that with the proper adjustment of the rod 45 either of the racks 32 and 36 may be thrown into and out of engagement with its corresponding gear on shaft 40, whereby different speeds are obtained. It is also understood that as the operation of the foot pedals is governed by means of the strap and pulley mechanism at the front of the vehicle, the racks 32 and 36 will occupy different positions relative to the ratchet wheels with which they are in mesh, as is shown in dotted line positions more particularly in Fig. 3.

Keyed on shaft 40 between the driving gear 33 and one of the ratchet wheels 41 is the reversing ratchet wheel 55, having peripheral teeth pitched in a direction opposite from those of ratchet wheels 41 and 43. Bell crank lever 57 is loosely mounted on shaft 40, between reversing ratchet wheel 55 and the driving gear 33, and is provided with an upwardly projecting arm member 58 and a shoe member 59. Pivotally mounted on the pedal bars between the racks 32 and 36, at the left of the driving gear 33, is the reversing rack 38′, of similar construction as racks 32 and 36, being adapted for actuation by the shoe member 59 of the bell crank lever 57, which engages its flange 60, to swing it into and out of engagement with the reversing ratchet wheel 55. The rod 61 connects the arm member 58 of the bell crank lever 57 with the reversing lever 62, which is mounted on pin 47, in the arm 22, at the front of the vehicle. By actuating the reversing lever 62, the bell crank lever 57 is moved on its axis on shaft 40 and forces the shoe member 59 into engagement with the reverse rack member 38′, whereby the latter is lifted out of engagement or mesh with the reversing ratchet wheel 55.

Fixedly mounted on the pin 47 between the hand lever 46 and the reversing rod 61, is the plate 63, having outwardly projecting lugs 64 arranged thereon, the same being preferably numbered 1, 2 and 3, and are adapted to indicate the position of the racks 32 and 36 relative to the ratchet wheels 41 and 43, when the said hand lever 46 is regulated on the plate 63.

Upon adjusting the hand lever to a position in line with plate lug #1, the lower racks 32 are allowed to mesh with the ratchet wheels 43, this position providing a high gear suitable for high speed. At #2 position, the racks 32 and 36 are out of mesh with all of the said ratchet wheels. When the hand lever is advanced to #3 position, the lower racks 32 are out of mesh with the ratchet wheels 43 and the upper racks 36 are in mesh with ratchet wheels 41, therefore providing a low gear for starting the vehicle. The reversing lever 62 operates through rod 61, and the bell crank lever 57 and shoe member 59 are positioned so that the said shoe member 59 is normally out of engagement with reversing rack 38′. When the reverse lever is actuated, the hand lever is positioned at #2 position on the plate 63, so that the racks 32 and 36 are both out of engagement with ratchet wheels 41 and 43, the bell crank is then rocked to release the shoe member 59 from contact with the rack, so that the same can mesh with the reversing ratchet wheel 55.

It can be seen that with a vehicle of this construction, two forward speeds and reverse are assured and means provided for throwing the racks out of engagement with the gears, whereby the operator may hold the pedal bars in an inoperative position and coast.

A vehicle of this type is very light in weight and is capable of being propelled at a very high rate of speed and by its simplicity of structure it is very obvious that same can be constructed at a very low cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a device of the kind described, the combination of a frame; a shaft journaled therein; a ratchet wheel fixed on said shaft; a pedal lever pivoted in said frame; a rack bar pivoted at one end of said pedal lever and meshing with said ratchet wheel, a flange on said rack bar; a lever loosely mounted on said shaft; a cam arm pivoted to said lever and having one end engaging said flange; and a connecting link connecting said cam arm with said frame, substantially as described.

2. In a device of the kind described, the combination of a frame; a shaft journaled therein; a smaller ratchet wheel and a larger ratchet wheel fixed on said shaft; a pedal lever pivoted in said frame; two rack bars pivoted to said pedal lever and each meshing with one of said ratchet wheels; a flange on each of said rack bars; a lever loosely mounted on said shaft; two cam arms pivoted to said lever at opposite ends of the pivotal points of the lever, the free ends of said cam arms engaging said flanges; and connecting links connecting said cam arms with said frame, substantially as described.

3. In a device of the kind described, the combination of a frame; a shaft journaled therein; a ratchet wheel fixed on said shaft; a pedal lever pivoted in said frame; a rack bar pivoted at one end to said pedal lever and meshing with said ratchet wheel; a flange on said rack bar; and a bell crank lever loosely mounted on said shaft, one arm of said bell crank having a cam surface engaging said flange, substantially as described.

4. In a device of the kind described, the combination of a frame; a shaft journaled in said frame; three ratchet wheels fixed on said shaft; a pedal lever pivoted in said frame; three rack bars pivoted on said pedal lever, two of said rack bars and their coöperating ratchet wheels being adapted to drive said shaft in one direction and the other rack bar and its coöperating ratchet wheel being adapted to drive said shaft in an opposite direction; a flange on each of said rack bars; a lever loosely mounted on said shaft; two cam arms pivoted to said lever on opposite ends of the pivotal point of said lever, the free ends of said cam arms adapted to engage the flanges of two of said rack bars; connecting links connecting said cam arms with said frame; a bell crank lever loosely mounted on said shaft, one arm of said bell crank lever having a cam surface engaging the flange of the remaining rack bar; and manually operable means connected with said lever and bell crank lever permitting the meshing of only one rack bar and its coöperating ratchet wheel at a time, substantially as described.

In testimony whereof I have signed my name to this specification in the presence of two subscribing witnesses.

LOUIS YUHAS.

Witnesses:
　JOSHUA R. H. POTTS,
　A. A. OLSON.